United States Patent [19]

Eckhardt et al.

[11] 4,161,312
[45] Jul. 17, 1979

[54] CARD FEEDING MECHANISM

[75] Inventors: Friedhelm Eckhardt, Eiserfeld-Niederschelden; Wolfgang Raffenberg, Kirchen-Wehbach; Axel Klein, Eiserfeld-Eisern, all of Fed. Rep. of Germany

[73] Assignee: U.S. Philips Corporation, New York, N.Y.

[21] Appl. No.: 858,267

[22] Filed: Dec. 7, 1977

[30] Foreign Application Priority Data

Dec. 9, 1976 [DE] Fed. Rep. of Germany ....... 2655789

[51] Int. Cl.² ........................................... B65H 29/00
[52] U.S. Cl. ......................................... 271/3; 271/64; 271/186; 271/225; 271/265
[58] Field of Search ..................... 271/3, 225, 64, 185, 271/186, 265

[56] References Cited

U.S. PATENT DOCUMENTS

| 3,273,886 | 9/1966 | Taylor | 271/225 |
| 3,523,687 | 8/1970 | Peterson | 271/186 |

Primary Examiner—Richard A. Schacher
Attorney, Agent, or Firm—David R. Treacy

[57] ABSTRACT

A card feeding and ejection device having supply guiding, input and ejection channels intersecting at a forked channel portion at which a movable deflector is located. In a first position of the deflector one card can be passing through the forked portion and out the ejection channel while another card is being fed from the supply guiding channel and through the input channel, in the opposite direction. A conveyor belt at the back of the input channel operates in the feed direction both during feed and automatic ejection to a storage magazine.

8 Claims, 3 Drawing Figures

CARD FEEDING MECHANISM

BACKGROUND OF THE INVENTION

1. Field of the Invention

The invention relates to a record carrier feeding and ejection device; and more particularly, to a device which automatically feeds cards, one at a time, from a supply magazine to a processing station and then ejects the processed card in the reverse direction to a storage magazine, which device can also accept or eject single cards from and to a buffer channel separate from the magazines.

Feeding devices of this general type are commonly used in accounting machines in which record cards, or carriers, are manually introduced individually to the processing station, and are ejected after processing into the channel through which they were introduced. Mechanisms of this type, to which the instant invention is related, are to be contrasted with those in which a record carrier is not returned in the reverse direction, but after processing is transported further in the general direction of feed-in and ejected downwardly. Record sheet and card handling devices of the general type being discussed have the common characteristic that a new card or record carrier can be inserted only after the previously processed carrier or card has been removed from the feeding device.

Often a number of record carriers are to be processed successively; for example, when interest accrues or payments are to be posted for all bank accounts, in order to speed this processing over that achieved when cards are individually fed and removed by hand one after the other, auxiliary mechanisms and automatic feeders have been developed to provide fast processing of a stack of cards.

2. Description of the Prior Art

German Offenlegungsschrift No. 2,606,697, to which copending U.S. application Ser. No. 766,661 assigned to the assignee of the instant application corresponds except for minor additions, discloses a feeding device of the general type described above. This device has a magazine for record carrier cards; a guide channel leading from the supply magazine to a second guide channel; an ejection channel leading from the second guide channel to the storage magazine; and a deflector for guiding a card being ejected either into the second guide channel for automatic magazine storage, or outward through a separate channel to an ejection station for manual removal. Because of the interrelationship of these channels and the use of the deflector, a further card to be processed cannot be fed from the supply magazine into the input guide channel until the previously processed card has been manually removed from the ejection station or has been transported entirely into the storage magazine. Similarly, manual feeding of a further card to a region below the deflector must await the manual removal of the previously processed card.

Another record card feeder, described in U.S. Pat. No. 3,598,396, allows either manual introduction or removal of single cards, or automatic feed from a supply magazine or to a storage magazine. A gate or deflector is located at the junction of an input channel with a buffer channel into which cards are moved for processing and to and from which they can be manually fed and removed, and an ejection channel through which cards in the input channel can be directed to a storage magazine. Automatically fed cards from the supply magazine and manually fed cards pass over the deflector in such a position that feeding is impossible while the deflector is set for ejection, although it would be topologically possible to feed a card from the supply magazine to the input channel while a previously processed card was awaiting removal from the buffer channel.

SUMMARY OF THE INVENTION

An object of the invention is to provide a card feeding mechanism which permits manual insertion or, alternatively, automatic feeding from the supply magazine, while the preceding record carrier is still in the feeding device and moving in the ejection direction. By providing an overlap of the introduction and ejection cycles of the record carrier, a higher through-put can be obtained from a given processing station.

A further object of the invention is to provide a card feeding mechanism having driving devices affecting cards in the common guide channel, traversed both during introduction and ejecting, which driving devices do not need to be stopped or reversed while a previously processed card is being ejected to the storage magazine.

Another object of the invention is to provide a mechanism in which deflection of a previously processed card into the buffer channel requires merely reversing the direction of travel of a driving device.

In accordance with the invention the card handling mechanism has a forked channel portion connecting a buffer channel through which cards are introduced, an ejection channel through which cards are rejected to a storage magazine, and an input channel through which cards travel to and from a processing station; a guide channel leading from a feeding magazine opens into the buffer channel in front of the forked portion; and a deflector, mounted in the forked portion and movable between a first position in which a card being ejected through the ejection channel passes by the deflector without being deflected, and a second position in which a card being ejected from the input channel is deflected so as to follow a path out through the buffer channel. The channels are so arranged that a card can be fed through the buffer channel into the input channel while a previously processed card is still passing through the input channel and forked portion and out the ejection channel, the leading edge of the card being fed contacting the previously processed card at an acute angle and being guided along that card and through the input channel for processing.

In a preferred embodiment of the invention, the mechanism includes sensing devices for sensing the presence and position of the card in the guide channel, and has a card transporting mechanism which will feed a card to a position a given distance from the forked portion while another card is in the input channel, and will then feed the first mentioned card through the buffer channel and forked portion upon operation of another transporting means for ejecting the card which was in the input channel out through the ejection channel. In a further preferred embodiment, a single magazine is located generally above the forked portion, the ejection channel communicating with the rear of the magazine, and a card separating device and transport rollers take cards from the front of the magazine one at a time and feed them through the guide channel opening into the buffer channel from above, in front of the forked portion so that a user has ready access to the buffer channel from the front of the apparatus for manual introduction and removal of individual cards.

According to another aspect of the invention, the input channel includes a card feeding device which operates in a feed direction to cause a single card which has been inserted to be directed down to the processing station; and the feeding device, input channel and forked portion are so arranged that the feeding device can continue to operate in the feed direction while a card is being ejected to and through the ejection channel.

In yet another preferred embodiment of the invention, the feeding device in the input channel includes a conveyor belt having an exposed surface forming a part of the rear channel wall, and a transport roller located in the forked portion at the front of the junction of the buffer and input channels, so that a leading edge of a card introduced through the buffer channel, either manually or from the guide channel, passes over the roller to the conveyor, and is then directed downward causing the card to bend about the transport roller while the leading edge of the card follows the conveyor belt downward. Preferably, the deflector is connected to the mechanism which drives the conveyor belt through a slip-coupling, the slip-coupling moving the deflector into the second position when the conveyor is caused to operate in the reverse direction. In a card feeder according to the invention, then, as soon as a card which is to be ejected to the storage magazine has passed a certain location in the input channel moving toward the forked portion, the feeding mechanism for the next card to be processed can be started so as to cause its leading edge to enter the buffer channel and then the forked portion, it being necessary only to control the feeding speeds and timing such that the upper edge of the card being ejected passes the location at which the leading edge of the card being introduced will strike the card being ejected before the next card has reached that location.

By the use of the conveyor belt described above, it is not necessary to have an additional feed-out transport for a card which is to be ejected into the buffer channel for manual removal, because the transport roller and the belt will continue to move the card upward into the buffer channel after the lower edge of the card has left the transport devices in the processing station, and will continue to propel the card into the buffer channel until the card is substantially straight and its bottom edge is no longer contacting the conveyor belt.

A preferred embodiment of the invention will be described in detail below, with reference to the accompanying drawing.

DESCRIPTION OF THE PREFERRED EMBODIMENTS

Figure 1:
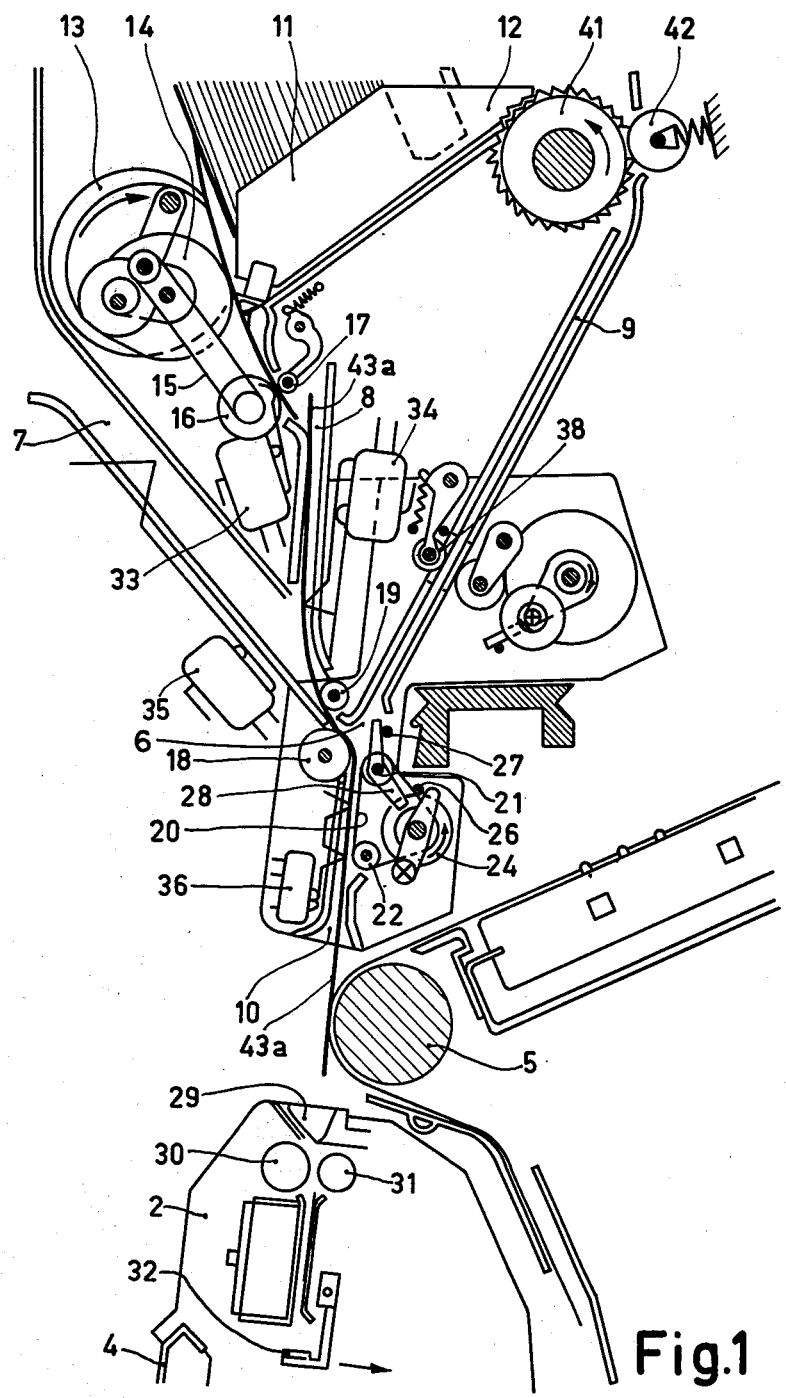
FIG. 1 is a side view, partly schematic and partly in section, of a card feeding device according to the invention showing a card being fed from the supply magazine.

The card processing apparatus shown in the drawing may conveniently be considered as having an upper section 1, which provides the card storage, feeding and ejection functions, and a lower section 2 which provides alignment and processing functions. The entire upper section 1 may be slidably mounted on a stationary guide rail 3, for example so that cards of different widths can conveniently be handled and aligned with the processing station below. The lower section 2 is similarly slidable sideways on a stationary guide rail 4, and passes beneath a printing anvil 5 around which, after the well-known practice in the art, an inked ribbon and/or paper for making a continuous permanent record of transactions may be passed.

The upper section 1 has a forked channel portion 6 through which cards pass to and from three principal channels connecting to legs of the forked portion for the passage of cards to be, or which have been, processed: a funnel or buffer channel 7 having an opening at one end at the front of the apparatus conveniently located for manual insertion or removal of a card, and leading at its other end into the first leg of the forked channel portion 6; a guide channel 8 located behind the principal part of the buffer channel, extending downward and opening into the buffer channel near the first leg end for the passage of cards which are being fed automatically; an ejection channel 9 behind the guide channel 8, extending upwardly at an input end from the second leg of the forked channel portion 6 for the passage of cards which have been processed and are being ejected for automatic storage; and an input channel 10 extending downward from the third leg of the forked channel portion for the passage of cards which are being fed to or ejected from a processing station in the lower section 2.

At the top of the upper section 1 there is a supply magazine 11 for the storage of record carrier cards that are to be fed automatically; preferably the rear portion of the magazine 11 is used as a storage magazine 12 for processed cards. Of course, in some applications it may be preferable to have separate supply and processed card magazines. For automatic feeding of cards from the supply magazine an electric motor 13 operates a card separating device which includes a separating roller 14 arranged to contact the stack of cards intermittently. The motor 13 also drives, through a belt 15, a transport or drive roller 16 whose surface speed is slightly higher than that of the separating roller 14, so that a card which has been separated from the stack in the magazine 11 is transported faster immediately after its departure from the separating device. To ensure a good traction grip of the transport roller 16 against a card, a counter roller 17 is spring-biased against the transport roller.

In response to control functions to be described later, when the lower or leading edge of a card, such as the card 43a in FIG. 1, has been advanced by the transport roller 16 all the way through the guide channel 8 into the buffer channel 7, the card comes in contact with and is driven by a transport roller 18, a part of whose surface forms part of the front lower surface of the forked channel portion 6. The card 43a is urged into firm contact with the transport roller 18 by another counter roller 19 located slightly above the roller 18 and forming part of the rear wall of the buffer channel. Slightly below the transport roller 18, and forming a part of the rear wall of the input channel 10, is a conveyor belt 20 which is passed around upper and lower deflection rollers 21 and 22 respectively and a drive roller 23 mounted behind the input channel. Between the rollers 21 and 22 the belt is parallel to the input channel 10. Via the drive roller 23, it is driven by a reversible electric drive motor 24, which also drives a crank arm 25 through a slip-coupling, coaxial with the roller 23. Preferably, the motor 24 also drives the roller 18 by means not shown.

Coaxially pivoted with the roller 21, a deflector lever 128 is located at the back of the forked portion 6. As shown in FIG. 1, in a first deflector position in which processed cards are ejected vertically upward to pass through the ejection channel 9 the lever arm rests against an abutment pin 27 which is fixed in the apparatus. To the other side of the coaxial pivot, the deflector lever 128 has an operating arm 28 extending generally in the direction of the arm 25 so that when, as shown in FIG. 2, the end of the arm 25 rotates in a clockwise direction and strikes the operating arm 28, the arm 28 is pressed against another abutment pin 26 that is fixed in the apparatus, rotating the deflector from the first position against the pin 27 to a second position in which it blocks the pathway leading from the input channel 10 to the ejection channel 9.

To provide more complete control on the positioning of a card for processing, such as printing against the anvil 5, the lower section 2 includes a funnel 29 for guiding a card to a transport roller 30 and counter roller 31 which are used to complete the feed of a card into the processing station, move it vertically for processing, and eject it up to the point where it will be removed by the various transport devices in the upper section 1. In addition, the lower section 2 has a support 32 for aligning a card that has been fed into the processing station.

To provide automatic operation based on the actual position of the various cards being processed or fed, the apparatus includes a number of sensing devices which are preferably provided in the form of microswitches. A switch 33 senses the presence of a card as soon as it has been separated by the separating roller 14 and has reached the transport roller 16. Another microswitch 34 is arranged to sense the presence of a card at the lower end of the channel 8, a short distance from the forked channel portion 6. Similarly, the presence of a card in the buffer channel 7, between the outer opening of the buffer channel and the place where the guide channel 8 joins the buffer channel, is sensed by another microswitch 35. Finally, the presence of a card at the general location of the conveyor belt in the input channel is sensed by a switch 36 which, in the embodiment shown in the drawing, has a pair of sensing fingers separated longitudinally along the channel.

To ensure that a card which has been ejected into the channel 9 will be moved fully through the channel, a transport roller 37, opposite which a spring-loaded counter roller 38 is located, is driven by a motor 39 through a slip-coupling 40. Similarly, at the top end of the ejection channel 9 another transport roller 41 and counter roller 42 ensure that a card being ejected is fed all the way up into the storage magazine 12.

Figure 2:
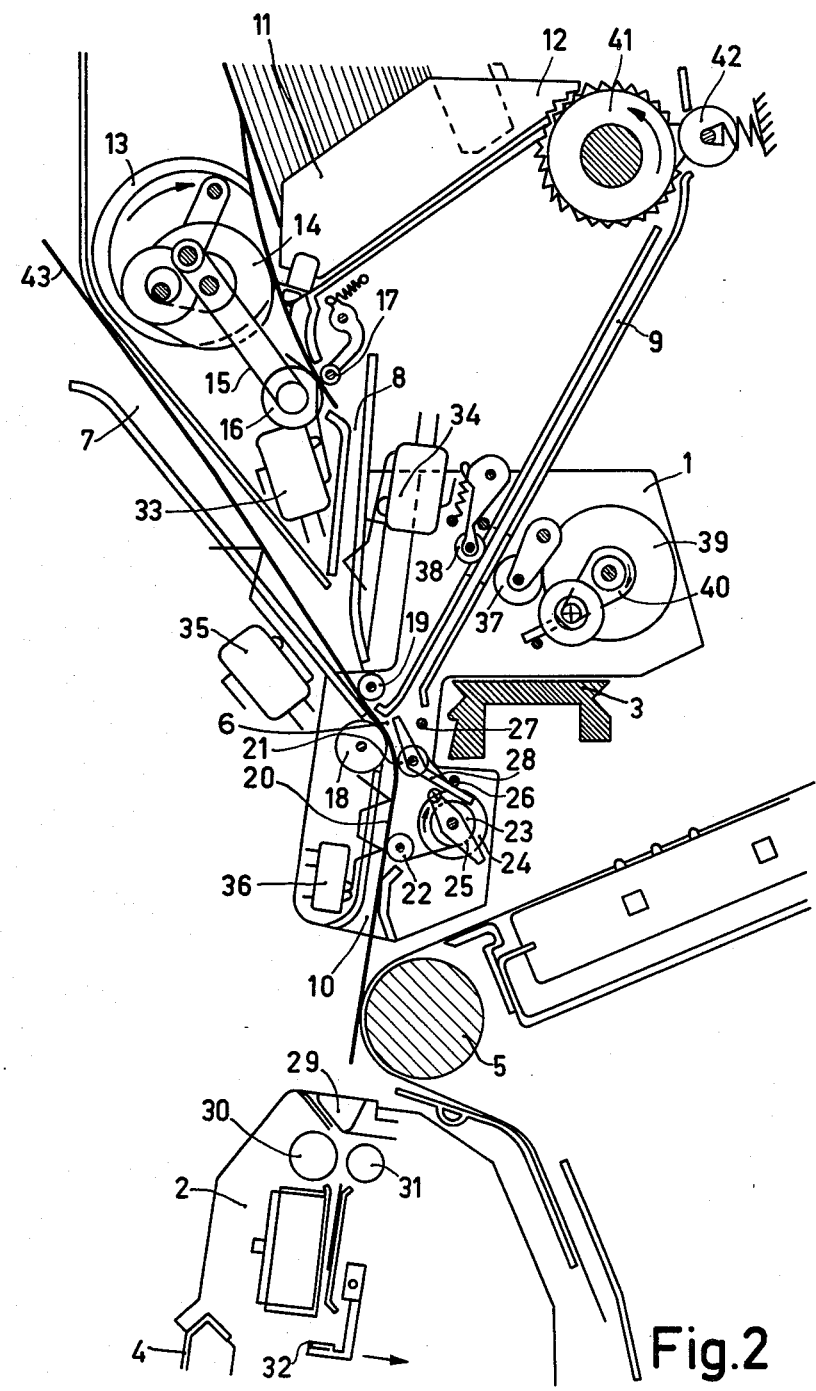
FIG. 2 is a similar view of the mechanism of FIG. 1, showing a record carrier being ejected to the buffer channel for manual removal.

As shown in FIG. 1, the arm 25 rests against the abutment pin 26 when the conveyor is operating in the feed direction shown in that figure.

To ensure that the deflector lever 128 stays firmly in its first position against the abutment pin 27 during the normal feed direction of the conveyor, a spring 44 connected to the deflector lever biases it firmly against the abutment.

AUTOMATIC OPERATION

The operating cycles of the mechanism will first be described with regard to FIGS. 1 and 3, in which the card 43a is being fed toward the processing station in the lower section 2, and a card 43b, shown in FIG. 3 only, is being ejected after processing.

A card 43a being fed automatically from the supply magazine 11, if there is no card in the lower section, will be transported immediately as far as the lower section 2. For that sequence, when the accounting machine supplies a command to insert a record carrier, in this case an account card, the motor 13 is energized and the first or foremost card is pulled off the stack by the separating roller 14 and fed to the transport roller 16. As soon as the card reaches the transport roller 16 with its counter roller 17, it is withdrawn from the stack of cards at an increased feed because of the greater surface speed of the roller 16 in comparison with the roller 14. The card is further transported into and through the guide channel 8 and into the buffer channel 7. During this motion the card will first have actuated the switch 33 and then the switch 34. However, the control circuitry is so arranged that if no card is in the processing station, actuation of these switches has no effect on the motor 13. Simultaneously with the command for insertion, the motor 24 for the transport roller 18 and conveyor belt 20 is energized, so that as it reaches the forked portion 6 the leading edge of the card 43a is deflected to the input channel 10 by passing under the counter roller 19 and over the transport roller 18. The front edge of the card will advance until it abuts the conveyor belt 20, which as shown in FIG. 1 is moving downward in the feed direction. The card is then bent so that the leading edge of the card advances downward in the input channel 10, actuating the fingers for the switch 36, and passing the printing anvil 5 on its way toward the lower section 2. Upon reaching the funnel 29 at the top of the lower section the card is guided between the drive roller 30 and counter roller 31 and continues in the feed direction until it rests on the support or alignment lever 32.

As will be seen in FIG. 1, before the leading edge of the card has reached the support 32, the upper edge will have passed the counter roller 17, and be free to straighten itself so that it deflects away from the roller 16. The finger of the switch 33 being thus released, the motor 13 is turned off.

When the card has advanced fully into the processing station, its rear edge, for example the card 43a as shown in FIG. 1 except further advanced, will pass by the operating finger of the switch 34, so that switch is no longer actuated. The next account card will then be transported further, because the motor 13 is switched on if the switch 33 is actuated and 34 is not actuated; the leading edge of this next account card is thus transported to the point where it operates the switch 34, causing the motor 13 to be de-energized.

When the account card to be processed has fully passed the transport roller 18, it will again become flat so that it can bear freely, under the force of its own weight, on the support and alignment levers 32, only one of which is shown. After alignment, the rollers 30 and 31 are brought into contact with the card so that it is held in place. The support and alignment levers 32 can then be deflected in the direction shown by the arrow in FIG. 1, taking them out of the path of the card 43a so that it can be pulled further into the lower section 2 for processing.

Upon its passage through the input channel 10, the card 43a will have actuated the switch 36 so that the control circuitry for the motor 13 will be changed from the first introduction mode to the repetitive cycling mode. Because the spring force of the sensing fingers of the switch 36 is very light, the card is not pressed against the conveyor belt with substantial force and it is possible to permit the motor 24 to run continuously in the feed direction without damaging the card 43a. Further, during processing the card is pulled in by the rollers 30 and 31 at least far enough that the upper edge of the count card enters the forked channel portion 6 and is in line with the bottom end of the ejection channel 9.

Figure 3:
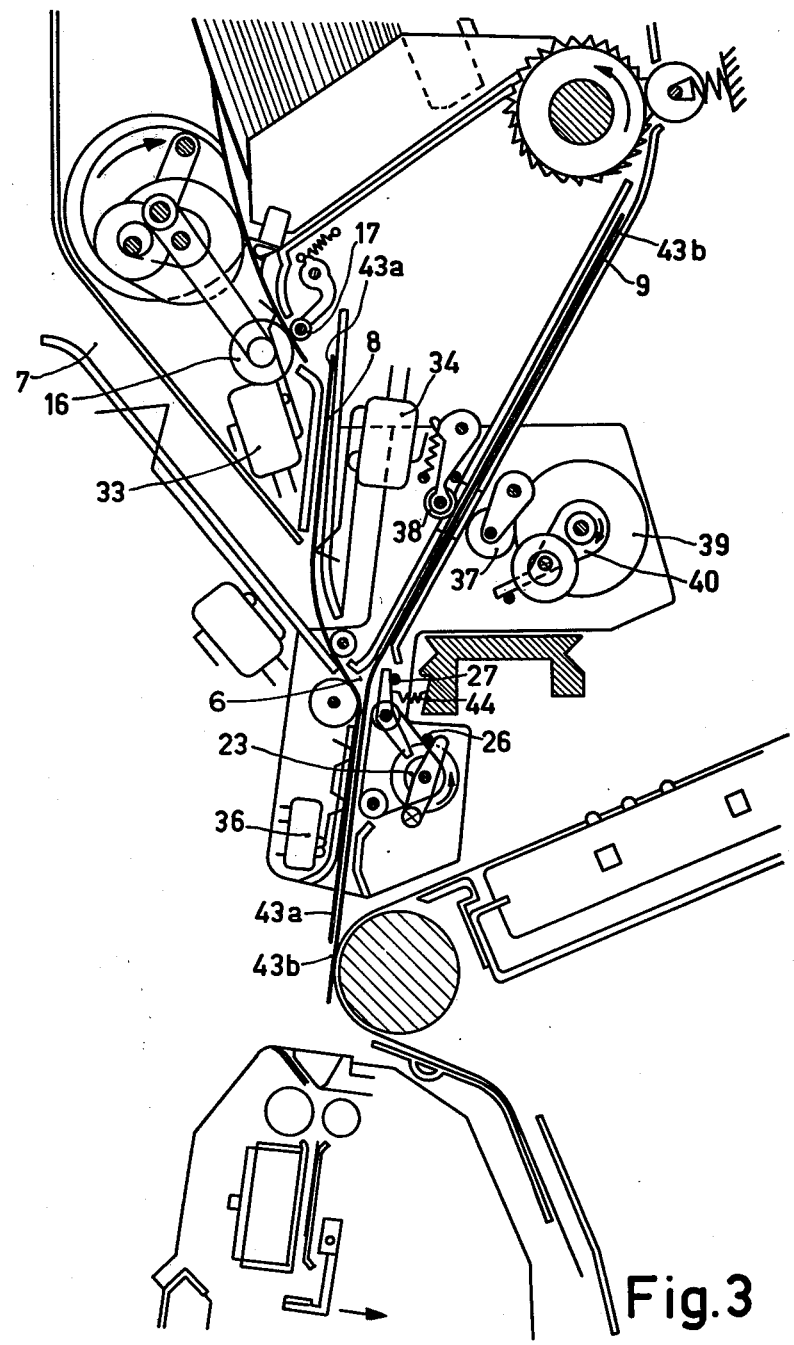
FIG. 3 is a similar view of the mechanism of FIG. 1, showing a processed record carrier being ejected to the storage magazine at the same time that a further card is being introduced from the supply magazine.

To eject an account card, for example the card 43b shown in FIG. 3, the accounting machine will be programmed so that the transport rollers 30 and 31 operate in the reverse direction. As soon as the upper edge of the card 43b deflects the corner of the nearer finger of the lever on the switch 36, actuation of this switch will energize the drive motor 24 in the feed direction as shown by the arrows in FIGS. 1 and 3.

Since the pressure exerted by the fingers of the switch 36 is small, the conveyor motion has no appreciable effect on the card, which continues to move upward, its top edge entering the ejection channel 9, being bent slightly, and passing up the channel 9. The crank arm 25 continues to be urged in the direction shown in FIGS. 1 and 3 and abuts the pin 26, while the spring 44 holds the deflector lever 128 against the pin 27. Upon actuation of switch 36, the separating motor 13 is also again energized, and a second account card 43a can then be fed.

The distance between the lower corner of the finger for switch 36 and the forked portion 6 is made less than the distance between the finger of the switch 34 and the forked portion, so that the leading edge of the descending card 43a will reach the card 43b after the latter's top edge has passed the forked portion. Further, the channels are so arranged that contact is at an acute angle, so that the card 43a will be deflected downward, and the two cards will not interfere and can move in opposite directions in the channel 10.

As the card 43b moves upward in the ejection channel 9, it is engaged by the transport roller 37 and counter roller 38, which will continue to drive it upward after the lower edge of the card has left the lower section 2 to reach and be further driven between the transport roller 41 and counter roller 42 until the card has been stored in the magazine 12. A switch (not shown) in the storage magazine causes the motor 39 and roller 41 to be turned off after storage has been completed.

MANUAL INSERTION AND REMOVAL

If cards such as 43a are not being fed automatically from the supply magazine, a single card may be fed manually by inserting it into the front funnel-like end of the buffer channel 7 so that the leading edge of the card passes all the way through the buffer channel and between the transport roller 18 and the counter roller 19, by its own weight carrying rearward until the lower edge abuts the conveyor belt 20. The weight of the card meantime will actuate the operating finger for the switch 35. When, upon receiving an electrical signal resulting from closing of the switch 35, an insertion command is given by the accounting machine, only the motor 24 will be energized so as to operate the conveyor belt 20 and transport roller 18 in the feed direction. The separating motor 13 is not energized. Further movement of the card continues as with automatic feeding, the movement of the conveyor belt causing the leading edge of the card to be deflected downward and the card to bend about the transport roller 18.

In an account card 43 is not to be ejected to the storage magazine 12, but rather is to be fed or rejected back to the buffer channel 7 for manual removal in response, for example, to a particular program of the accounting machine or as the result of information stored on the card 43, operation is as shown in FIG. 2. Upon actuation of the switch 36 as a result of upward movement of the card between the transport roller 30 and counter roller 31, the motor 24 will be energized in the opposite direction (shown by an arrow in FIG. 2) from that used for feeding. As a result of the reverse motion the crank arm 25 is driven in the reverse, or clockwise direction by the slip-coupling (not shown) so that the crank pin end of the arm 25 strikes the operating arm 28 thereby moving the deflector lever 128 away from the first position against the abutment pin 27, to the second position shown in FIG. 2, in which the operating arm 28 abuts the pin 26. The passageway leading from the input channel 10 to the ejection channel 9 is now blocked, and when the top edge of the card 43 reaches the forked portion 6 it is deflected by the lever 128 so as to pass between the transport roller 18 and counter roller 19. At the same time, the card 43 is bent so that the back edge of the card presses against the conveyor belt 20 with an increased force. Due to reverse operation of the motor 24, the exposed portion of the conveyor belt is now operating in an upward direction reverse to the feed direction, as also is the transport roller 18, the card thus being propelled upward and out through the buffer channel 7 as its lower end passes from between the transport roller 30 and counter roller 31, and out of the lower section 2. This movement continues until the card 43 is approximately flat, fully in the buffer channel 7. The switch 35 will again be actuated, so as to prevent introduction of a card 43a from the magazine 11.

As a result of the above description, many other embodiments and modifications falling within the spirit of the invention and the appended claims will be apparent to those of ordinary skill in the art. For example, as a result of an accounting processing command or a coding on a record carrier card itself, certain cards can be ejected downward through the lower section 2 into a separate storage location. Also, and more closely affecting the operation of the invention itself, the transport roller 18 and its counter roller may be located at a different position further from the forked channel portion 6, closer to the junction of the guide channel 8 and the buffer channel 7, or separate transport rollers for the guide channel 8 and the buffer channel 7 may be provided. In such a case it may be desirable to locate an idler roller at the actual corner of the fourth portion 6 where a card being fed in bends.

The buffer channel need not be in front of and below the guide channel 8, but may with some care in design be arranged to pass between the guide channel 8 and the ejection channel 9. In such situation of course a single magazine for both feeding and storage cannot readily be used, because a manually introduced card being fed into the buffer channel would most easily be passed between the supply and storage magazines.

The transport device which deflects the leading edge of a first card which is being inserted downward into the input channel need not be a conveyor belt if a combination of other devices having similar effect is to be substituted. For example, a relatively large diameter roller could provide a similar function, provided that the leading edge of a card passing downward were directed so as to pass smoothly into the input channel. Other types of deflector, or multiple deflectors may be used; they might be pivoted about the axis of such a large roller, or be movable in some other fashion.

We claim:

1. A card handling mechanism for feeding cards to and receiving cards in a reverse direction from a processing station, comprising:
   a supply magazine for storing cards to be processed;
   a guide channel, and first means for feeding a card from the supply magazine to and through the guide channel;
   a forked channel portion having first, second and third legs;
   an input channel extending from said forked channel portion third leg disposed for receiving a card fed through the first leg;
   an ejection channel having an input end disposed for receiving a card ejected from the input channel through the forked channel out the second leg;
   second means for feeding a card in the input channel in a feed direction for processing, and for ejecting a card in the input channel in a direction opposite said feed direction; and
   a buffer channel arranged to permit manual insertion of a card through the buffer channel, into said first leg, for feeding into the input channel;
   wherein said guide channel opens into the buffer channel in front of said first leg;
   said mechanism includes a deflector, and means for mounting and moving said deflector at least between a first position in which a card being ejected from said input channel follows an undeflected path from said third leg to said second leg, and a second position in which the card being ejected from said input channel is deflected so as to follow a path out said first leg; and
   said channels and forked channel portion are so arranged that a card being fed through said guide channel and said first leg while another card is being ejected along said undeflected path will contact said another card at an acute angle and be guided along said another card and through said input channel for processing.

2. A mechanism as claimed in claim 1, wherein said mechanism includes a first sensing device for sensing the presence and position of a card in said guide channel, said first means being responsive to said sensing device so as to feed a card to a position a given distance from said forked portion while a card is in said input channel, and to feed a card to and through said first leg responsive to operaton of said second means to reject a card.

3. A mechanism as claimed in claim 2, wherein said input channel includes a second sensing device for sensing the position of a leading edge of a processed card being ejected through said input channel toward said ejection channel; said given distance is greater than a distance between the sensed position of a leading edge and the forked portion; and feeding a card through said first leg is initiated in response to sensing the position of said leading edge by said second sensing device.

4. A mechanism as claimed in claim 1, wherein said supply magazine has a rear space communicating with said ejection channel; said first means includes means for separating and feeding cards from the front of the magazine; and said ejection channel has means for feeding an ejected card to the rear of the magazine for storage therein.

5. A card handling mechanism for feeding cards to and receiving cards in reverse direction from a processing station comprising:
   a forked channel portion having first, second and third legs;
   an input channel extending from said forked channel portion third leg disposed for receiving a card fed through said first leg;
   an ejection channel having an input end disposed for receiving a card ejected from the input channel, through the forked channel out its second leg;
   means for ejecting a card whose leading edge has reached a given position in the ejection channel, through the ejection channel; and
   means for feeding a card which is at least partially in the input channel, in a feed direction for processing;
   wherein said means for feeding includes a transport device having a surface exposed along a wall of said input channel opposite said first leg arranged for engaging and feeding a leading edge of a card at a location within the input channel while the input channel is free of a processed card, said transport device operating in a feeding direction, and wherein said transport device continues to operate in said feeding direction during ejection of a processed card through the ejection channel.

6. A mechanism as claimed in claim 5, wherein said transport device includes a conveyor belt, and a transport roller disposed at the junction of said first and third legs such that a card fed from said first into said third leg is bent where it passes over said transport roller; said conveyor belt being so arranged that a leading edge of a card passing over said transport roller and travelling across the input channel at an acute angle will contact a portion of the conveyor belt surface which is moving in the feeding direction parallel with the input channel, said leading edge being caused to move along the input channel thereby bending the card about the transport roller.

7. A mechanism as claimed in claim 5, comprising in addition:
   a buffer channel arranged to permit manual insertion of a card, through the buffer channel, through said first leg, for feeding into the input channel;
   a deflector, and means for mounting and moving said deflector at least between a first position in which a card being ejected from said input channel follows an undeflected path from said third leg to said second leg, and a second position in which a card being ejected from said input channel is deflected so as to follow a path out said first leg and said buffer channel; and
   means for operating said transport device in a direction opposite said feeding direction;
   wherein said means for mounting and moving said deflector comprise means for moving said deflector to said first position in response to operation of said transport device in the feeding direction, and for moving the deflector to the second position in response to operation of the transport device in said opposite direction.

8. A mechanism as claimed in claim 7 wherein said transport device includes a conveyor belt, a plurality of rollers over which said conveyor belt is passed, so arranged as to position a portion of said conveyor belt parallel to the feed direction of said input channel, a driving roller for said belt, and means for driving the driving roller; said deflector is pivoted about an axis coaxial with one of said rollers; and said means for mounting and moving comprises a member mounted for rotation about said driving axis, stop means for preventing rotation of said member when the transport device is operating in the feeding direction beyond a given angle; and a slip-clutch connecting said member to said driving roller, wherein said member is so arranged as to engage and move the deflector to the second position in response to rotation of the member in a direction corresponding to opposite direction of the transport device.

* * * * *